(12) United States Patent
Jeong et al.

(10) Patent No.: US 12,368,200 B2
(45) Date of Patent: Jul. 22, 2025

(54) BATTERY CELL AND BATTERY MODULE INCLUDING THE SAME

(71) Applicant: SK On Co., Ltd., Seoul (KR)

(72) Inventors: Won Seok Jeong, Daejeon (KR); Myung Hoon Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 300 days.

(21) Appl. No.: 17/443,689

(22) Filed: Jul. 27, 2021

(65) Prior Publication Data

US 2022/0037722 A1 Feb. 3, 2022

(30) Foreign Application Priority Data

Jul. 28, 2020 (KR) .................. 10-2020-0093898

(51) Int. Cl.
*H01M 50/184* (2021.01)
*H01M 50/105* (2021.01)
*H01M 50/202* (2021.01)
*H01M 50/211* (2021.01)
*H01M 50/291* (2021.01)

(52) U.S. Cl.
CPC ....... *H01M 50/184* (2021.01); *H01M 50/105* (2021.01); *H01M 50/202* (2021.01); *H01M 50/211* (2021.01); *H01M 50/291* (2021.01)

(58) Field of Classification Search
CPC ............. H01M 50/184; H01M 50/202; H01M 50/105; H01M 50/211; H01M 50/291
See application file for complete search history.

(56) References Cited

U.S. PATENT DOCUMENTS

| 8,708,321 | B2 | 4/2014 | Hong | |
|---|---|---|---|---|
| 10,074,832 | B2 | 9/2018 | Hong et al. | |
| 10,270,069 | B2* | 4/2019 | Jo | H01M 10/052 |
| 10,629,875 | B2 | 4/2020 | Choi et al. | |
| 2012/0219847 | A1 | 8/2012 | Hong et al. | |
| 2013/0029212 | A1* | 1/2013 | Hong | H01M 50/178 269/21 |
| 2013/0149601 | A1* | 6/2013 | Hong | H01M 10/0436 429/185 |
| 2016/0087252 | A1 | 3/2016 | Hong et al. | |
| 2018/0331336 | A1* | 11/2018 | Choi | H01M 50/211 |

FOREIGN PATENT DOCUMENTS

| KR | 1020120097312 A | 9/2012 |
|---|---|---|
| KR | 1020130014371 A | 2/2013 |
| KR | 1020140144843 A | 12/2014 |
| KR | 1020180020546 A | 2/2018 |
| KR | 1020180117783 A | 10/2018 |
| KR | 1020180137211 A | 12/2018 |

OTHER PUBLICATIONS

EPO English Machine Translation of KR20180137211 originally published to Nam Min on Dec. 27, 2018 (Year: 2018).*

* cited by examiner

*Primary Examiner* — Brittany L Raymond
(74) *Attorney, Agent, or Firm* — The Webb Law Firm

(57) ABSTRACT

A battery cell includes an electrode assembly; a pouch-type cell case including an accommodation portion in which the electrode assembly is accommodated and a sealing portion formed in at least a portion of a circumference of the accommodation portion, a reinforcing member disposed on the sealing portion so that the sealing portion is in close contact with the accommodation portion, and a fixing member fixing the reinforcing member to the cell case.

15 Claims, 11 Drawing Sheets

BATTERY CELL AND BATTERY MODULE INCLUDING THE SAME

CROSS-REFERENCE TO RELATED APPLICATION

This application claims priority to Korean Patent Application No. 10-2020-0093898 filed Jul. 28, 2020, the disclosure of which is hereby incorporated by reference in its entirety.

BACKGROUND OF THE INVENTION

1. Field of the Invention

The present disclosure relates to a battery cell and a battery module including the same.

2. Description of Related Art

Secondary batteries are chargeable and dischargeable, unlike primary batteries, and thus may be applied to devices within various fields such as digital cameras, mobile phones, notebook computers, and hybrid vehicles. Secondary batteries include, for example, a nickel-cadmium battery, a nickel-metal hydride battery, a nickel-hydrogen battery, and a lithium secondary battery.

Among such secondary batteries, research into lithium secondary batteries having high energy density and discharge voltage has been actively conducted, and recently, lithium secondary batteries have been manufactured as flexible pouch-type battery cells and a plurality of pouch-type battery cells may be connected in the form of a module to be used.

Meanwhile, such a pouch-type battery cell includes a sealing portion for sealing a pouch by heat sealing along the edges.

However, when an internal pressure of a battery cell increases, the sealing portion may be peeled off by pressure. Therefore, there is a demand for a battery cell capable of preventing peeling of the sealing portion.

SUMMARY OF THE INVENTION

Exemplary embodiments provide a battery cell in which peeling of a sealing portion is suppressed and a battery module including the same.

According to an aspect of the present disclosure, a battery cell includes: an electrode assembly; a pouch-type cell case including an accommodation portion in which the electrode assembly is accommodated and a sealing portion formed in at least a portion of a circumference of the accommodation portion; a reinforcing member disposed on the sealing portion so that the sealing portion is in close contact with the accommodation portion; and a fixing member fixing the reinforcing member to the cell case.

The sealing portion may be folded at least once and subsequently may be in close contact with the accommodation portion.

The reinforcing member may have a flat bar-like shape.

The reinforcing member may include a pressing portion in surface contact with the sealing portion and a support portion extending from the pressing portion and having at least a portion in contact with the accommodation portion.

The support portion and the pressing portion may be disposed on different planes.

An internal angle between the support portion and the pressing portion may be 180° or less.

A thickness of the support portion may be greater than a thickness of the pressing portion.

A cross-section of the reinforcing member may have an arc shape in a width direction.

The reinforcing member may have resistivity of 500 Ω·m or greater.

A width of the reinforcing member may be smaller than a thickness of the accommodation portion.

The fixing member may include adhesive tape.

The fixing member may be attached to cover the entirety of the reinforcing member.

The fixing member may be provided in plural and the plurality of fixing members may be spaced apart from each other.

According to another aspect of the present disclosure, a battery module includes: at least one of the battery cell described above and a module case accommodating the at least one battery cell therein.

According to an aspect of the present disclosure, a battery module includes: a battery cell stack in which a plurality of battery cells are stacked; a reinforcing member coupled to one surface of the battery cell stack and disposed to be in surface contact with a sealing portion of the battery cell; and a fixing member fixing and attaching the reinforcing member to the battery cell stack, wherein the reinforcing member is coupled to at least two battery cells or all of the plurality of battery cells.

BRIEF DESCRIPTION OF DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
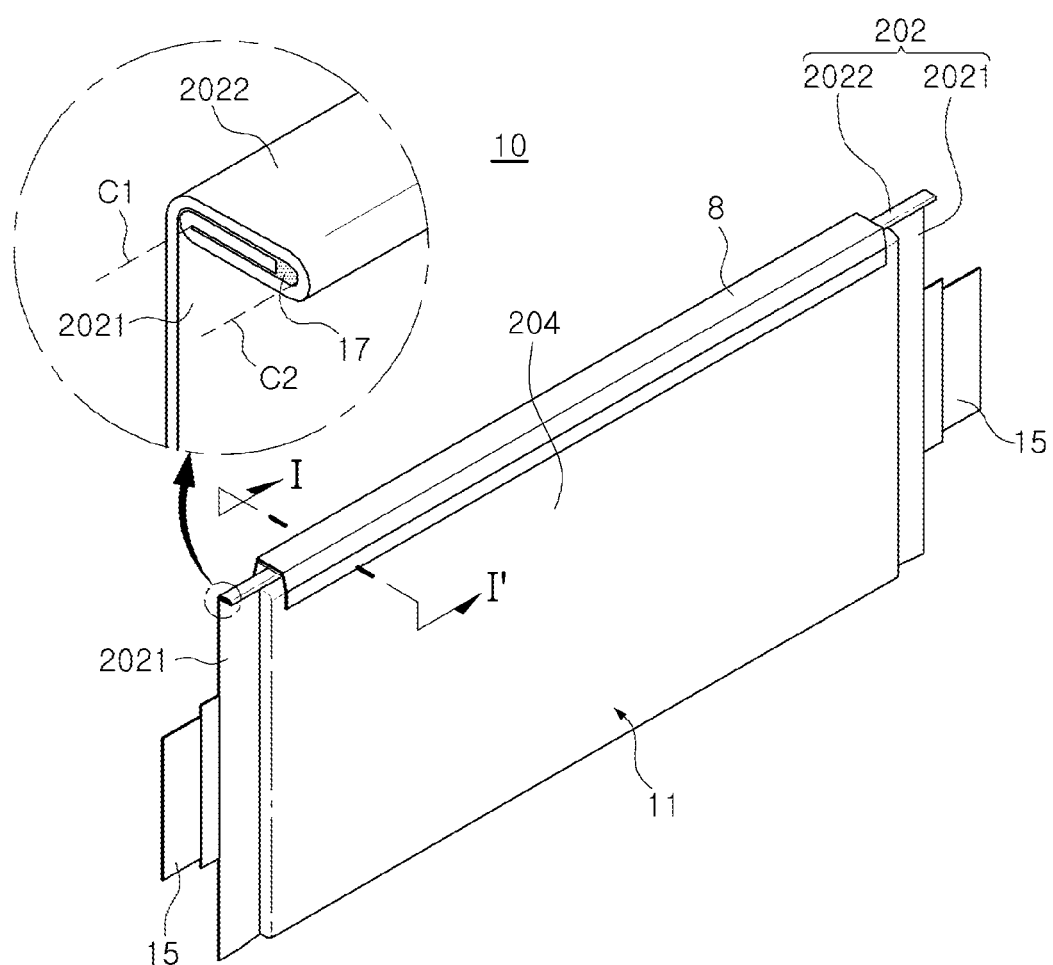
FIG. 1 is a perspective view schematically illustrating a battery cell according to an exemplary embodiment in the present disclosure.

Prior to the description of the present disclosure, terms and words used in the present specification and claims to be described below should not be construed as being limited to ordinary or dictionary terms, and should be construed in accordance with the technical idea of the present disclosure based on the principle that the inventors can properly define their own inventions in terms of terms in order to best explain the invention. Therefore, the exemplary embodiments described in the present specification and the configurations illustrated in the drawings are merely the most preferred exemplary embodiments of the present disclosure and are not intended to represent all of the technical ideas of the present disclosure, and thus should be understood that various equivalents and modifications may be substituted at the time of the present application.

Hereinafter, exemplary embodiments of the present disclosure will be described in detail with reference to the accompanying drawings. In this case, in the drawings, the same components are denoted by the same reference symbols as possible. Further, the detailed description of well-known functions and constructions which may obscure the gist of the present disclosure will be omitted. For the same reason, some of the elements in the accompanying drawings are exaggerated, omitted, or schematically illustrated, and the size of each element does not entirely reflect the actual size.

Figure 2:
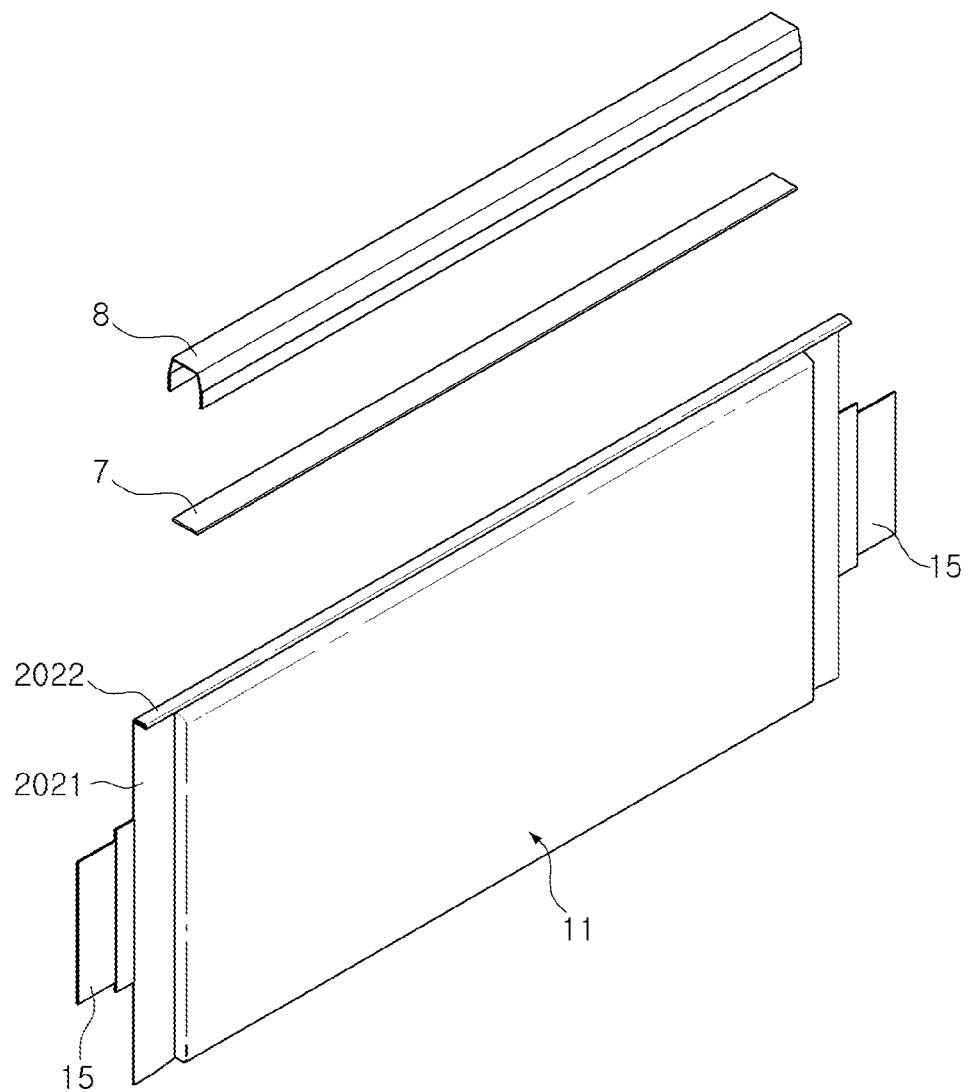
FIG. 2 is an exploded perspective view of FIG. 1.
Figure 3:
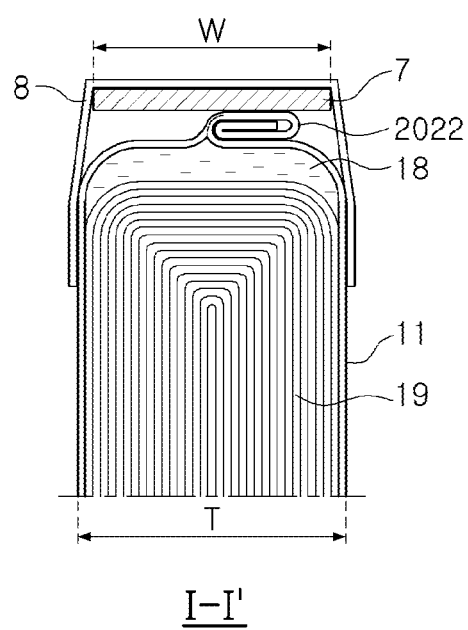
FIG. 3 is a partial cross-sectional view taken along line I-I' in FIG. 1.

FIG. 1 is a perspective view schematically illustrating a battery cell according to an exemplary embodiment in the present disclosure, FIG. 2 is an exploded perspective view of FIG. 1, and FIG. 3 is a partial cross-sectional view taken along line I-I' in FIG. 1.

Referring to FIGS. 1 through 3, a battery cell 10 according to the present exemplary embodiment may be a pouch-type secondary battery, and has a structure in which an electrode lead 15 protrudes externally from the body. The battery cell 10 may be a battery which is rechargeable and dischargeable, and specifically, may be a lithium ion (Li-ion) battery or a nickel metal hydride (Ni-MH) battery.

The battery cell 10 may be configured such that an electrode assembly 19 is accommodated in a cell case 11.

The electrode assembly 19 includes a plurality of electrode plates and electrode tabs and is accommodated in the cell case 11. Here, the electrode plates may include a positive plate and a negative plate, and the electrode assembly may be configured in a form in which the positive plate and the negative plate are stacked so that wide surfaces thereof face each other with a separator interposed therebetween.

The positive plate and the negative plate are formed by applying an active material slurry to a current collector, and the slurry may be generally formed by adding active material particles, an auxiliary conductor, a binder, a plasticizer, and the like, to a solvent, and stirring the resultant solvent.

In addition, in the electrode assembly 19, a plurality of positive plates and a plurality of negative plates are stacked in a vertical direction. In this case, an electrode tab is provided on each of the plurality of positive plates and the plurality of negative plates, and electrode tabs having the same polarity may be in contact with each other and connected to the same electrode lead 15.

In the present exemplary embodiment, two electrode leads 15 may be disposed to face in opposite directions to each other.

The cell case 11 may provide a sealed space in which the electrode assembly 19 and an electrolyte 18 are accommodated. Here, a portion of the electrode lead 15 of the electrode assembly 19 may be exposed externally from the cell case 11.

The cell case 11 is a pouch-type cell case and may be divided into a sealing portion 202 and an accommodation portion 204.

The accommodation portion 204 may be formed as a container to provide an internal space having a rectangular shape. The electrode assembly 19 and the electrolyte 18 are accommodated in the internal space of the accommodation portion 204.

The sealing portion 202 may be formed as a flange extending externally from the accommodation portion 204 formed as a container. Accordingly, the sealing portion 202 may be disposed in at least a portion of a circumference of the accommodation portion 204 along the circumference of the accommodation portion 204.

The sealing portions 202 may be bonded using a thermal fusion method, but is not limited thereto.

In addition, in the present exemplary embodiment, the sealing portion 202 may be divided into a first sealing portion 2021 in which the electrode lead 15 is disposed and a second sealing portion 2022 in which the electrode lead 15 is not disposed.

In the present exemplary embodiment, the cell case 11 may be formed using a sheet of an exterior material through a forming process. More specifically, after one or two receiving portions are formed in one exterior material, the exterior material may be folded so that the receiving portions form a single space (i.e., the accommodation portion), thereby completing the cell case 11.

The exterior material may be formed of a sheet material in which a metal layer and a resin layer are repeatedly laminated, but is not limited thereto.

In the present exemplary embodiment, the accommodation portion 204 may be formed in a quadrangular shape. In addition, since the accommodation portion 204 and the sealing portion 202 are formed by folding a single exterior material, it is not necessary to form the sealing portion 202 on a surface in which the exterior material is folded in the battery cell 10 of the present exemplary embodiment. Therefore, in the present exemplary embodiment, the sealing portion 202 is only provided on three of the four side surfaces forming the outer portion of the accommodation portion 204, and the sealing portion is not disposed on any one (lower surface in FIG. 1) of the outer portion of the accommodation portion.

In the present exemplary embodiment, since the electrode leads 15 are arranged to face in the mutually opposing directions, the two electrode leads 15 may be disposed on the sealing portions 202 formed on different sides. Therefore, the sealing portion 202 of present exemplary embodiment may be classified into two first sealing portions 2021 in which the electrode lead 15 is disposed and one second sealing portion 2022 in which the electrode lead 15 is not disposed.

In addition, in the battery cell 10 of present exemplary embodiment, the sealing portion 202 may be configured to be folded at least once to increase bonding reliability of the sealing portion 202 and minimize a volume of the sealing portion 202 occupied by the sealing portion 202 in the module of the sealing portion 202.

More specifically, the battery cell 10 according to the present exemplary embodiment may be configured such that only the second sealing portion 2022, in which the electrode lead 15 is not disposed in the sealing portion 202, is folded twice.

The second sealing portion 2022 may be folded in a direction to reduce an area of the battery cell. For example, in the present exemplary embodiment, the bending lines C1 and C2, which are lines on which the second sealing portion 2022 is folded, are arranged parallel to the outer portion of the accommodation portion 204, and at least a portion of the second sealing portion 2022 may be folded along the bending lines C1 and C2. Accordingly, the second sealing portion 2022 folded at least once may have the same width as a whole.

The second sealing portion 2022 may be folded twice by 180° along the first bending line C1 and the second bending line C2 illustrated in FIG. 3 and then folded again by 90° along the first bending line C1 so as to be fixed by a fixing member 19.

The second sealing portion 2022 may be folded twice by 180° along the first bending line C1 and the second bending line C2 illustrated in FIG. 1, and then folded again by 90° along the first bending line C1 so as to be disposed in close contact with the accommodation portion 204. However, the present disclosure is not limited thereto, and various modifications may be made as needed, such that the second sealing portion 2022 may be folded once by 180° so as to have a width reduced to a half and then folded by 90° along the first bending line C1.

An inside of the folded second sealing portion 2022 may be filled with an adhesive member 17, and thus, a shape of the folded second sealing portion 2022 by the adhesive member 17 may be maintained. The adhesive member 17 may be formed of an adhesive having high thermal conductivity. For example, the adhesive member 17 may be formed of epoxy or silicon, but is not limited thereto.

In addition, the battery cell 10 of the present exemplary embodiment may include a reinforcing member 7 and a fixing member 8 to attach and fix the sealing portion 202 to the accommodation portion 204.

The reinforcing member 7 and the fixing member 8 may be provided to attach and fix the second sealing portion 2022 of the sealing portion 202, in which the electrode lead 15 is not disposed, toward the accommodation portion 204.

The reinforcing member 7 may be formed of an insulating material having rigidity allowing a shape to be maintained.

The reinforcing member 7 is stacked on the second sealing portion 2022 and coupled to a side surface of the accommodation portion 204. Accordingly, the second sealing portion 2022 may be disposed in parallel with the reinforcing member 7 and may be disposed to be in surface contact with the reinforcing member 7.

In the present exemplary embodiment, the reinforcing member 7 may be formed as a flat rod. In addition, in the present exemplary embodiment, since the reinforcing member 7 is disposed on the side surface of the accommodation portion 204, if the reinforcing member 7 has a width larger than a thickness of the accommodation portion 204, interference may occur when the battery cells 10 are stacked.

Thus, the reinforcing member 7 may be formed to have a width smaller than the thickness of the accommodation portion 204. In addition, a length of the reinforcing member 7 may be formed to be shorter than a length of the accommodation portion 204. However, the present disclosure is not limited thereto, and the reinforcing member 7 may be formed to be greater than the length of the accommodation portion 204 as necessary.

The reinforcing member 7 may be formed of an insulating material such as resin. For example, the reinforcing member 7 of the present exemplary embodiment may be formed of a material having a resistivity of 500 $\Omega \cdot m$ or greater. In addition, the reinforcing member 7 may be formed of a material having rigidity which is not easily deformed by an external force.

The fixing member 8 may be attached to an outer surface of the reinforcing member 7 and a surface of the battery cell 10 to attach and fix the reinforcing member 7 to the battery cell 10.

The fixing member 8 may include, but is not limited to, adhesive tape. For example, after applying an adhesive solution to the outer surface of the reinforcing member 7 and the surface of the battery cell, a film or sheet may also be attached thereto, as the fixing member 8. The fixing member 8 may be provided as a clip.

Like the reinforcing member 7, the fixing member 8 may be formed of an insulating material.

Referring to FIG. 1, the fixing member 8 may be provided as a single member and bonded to the battery cell to cover the entirety of the reinforcing member 7. However, the present disclosure is not limited thereto, and the fixing member may be provided in various forms.

Figure 4:
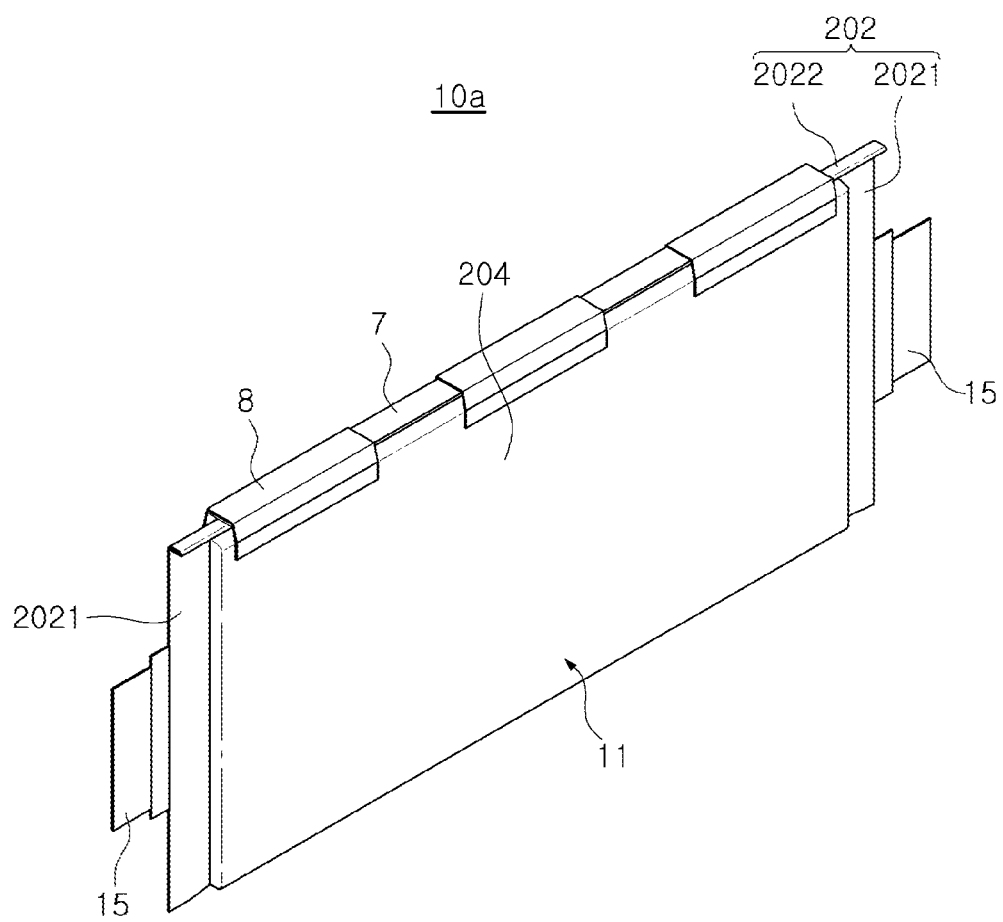
FIG. 4 is a perspective view schematically illustrating a battery cell according to another exemplary embodiment in the present disclosure.

FIG. 4 is a perspective view schematically illustrating a battery cell according to another exemplary embodiment in the present disclosure, in which a plurality of fixing members 8 are provided.

As illustrated in FIG. 4, a plurality of fixing members 8 may be arranged to be spaced apart from each other by a predetermined distance to partially cover the reinforcing member 7. In this case, a portion of the reinforcing member 7 of a battery cell 10a may be exposed externally from the fixing member 8.

As described above, since the battery cell 10 of the present exemplary embodiment is formed using a sheet of an exterior material through a forming process, the sealing portion 202 is not formed on a lower surface of the battery cell 10 in FIG. 1. Thus, in the battery cell 10 of the present exemplary embodiment, the reinforcing member 7 and the fixing member 8 may be disposed only on the upper surface of the battery cell 10 on which the second sealing portion 2022 is disposed.

Therefore, when the sealing portion is also formed on the lower surface of the battery cell 10, the reinforcing member 7 and the fixing member 8 may also be disposed on the lower surface of the battery cell 10.

The battery cell 10 according to the present exemplary embodiment configured as described above includes the reinforcing member 7 and the fixing member 8 in order to attach the second sealing portion 2022 to the accommodation portion 204.

In the case of fixing the second sealing portion 2022 the accommodation portion 204 with an adhesive or the like, a process of applying and curing a liquid adhesive between the second sealing portion 2022 and the accommodation portion 204 needs to be performed, which may make a manufacturing process complicated and increase a manufacturing time.

In contrast, in the case of using the reinforcing member 7 and the fixing member 8 as in the present exemplary embodiment, the process is simple and the manufacturing time may be shortened. In addition, since curing equipment using heat or ultraviolet rays is not required to cure the adhesive, the manufacturing equipment is simplified.

In addition, since the second sealing portion 2022 is stably fixed in close contact with the accommodation portion 204, deformation of the second sealing portion 2022 may be suppressed. Accordingly, reliability of the battery cell 10 may be improved and electrical insulation between the battery cell 10 and an external structure (e.g., a module case, etc.) may be strengthened.

Next, a battery module 100 including the battery cell 10 described above will be described.

Figure 5:
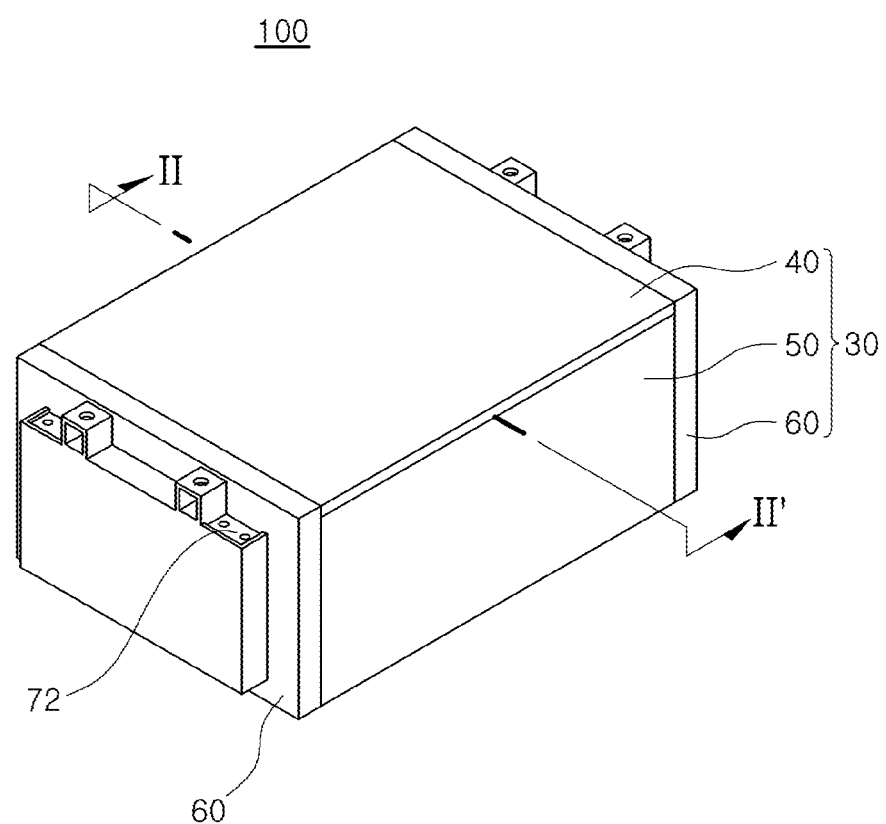
FIG. 5 is a perspective view schematically illustrating a battery module according to an exemplary embodiment in the present disclosure.
Figure 6:
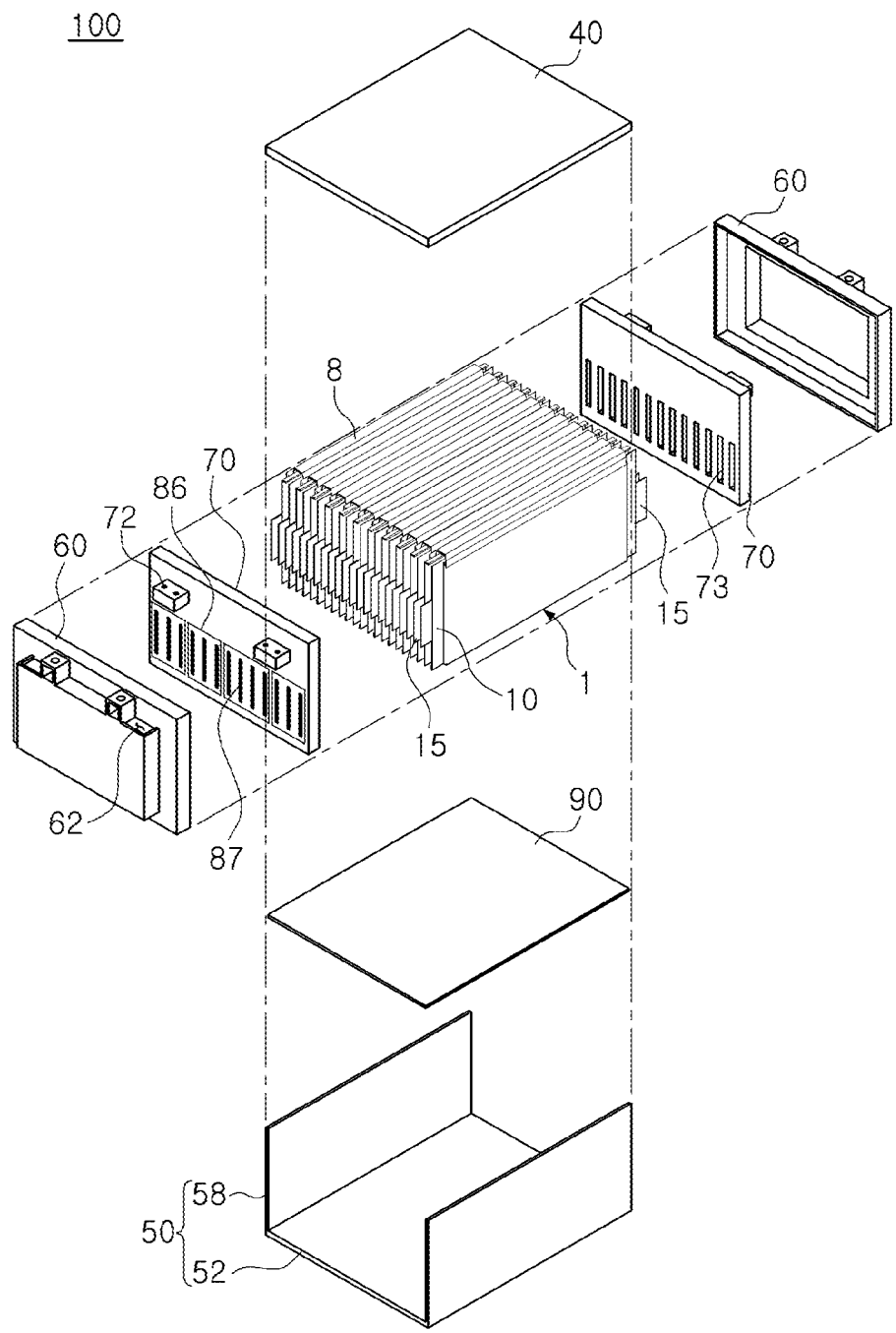
FIG. 6 is an exploded perspective view of the battery module illustrated in FIG. 5.
Figure 7:
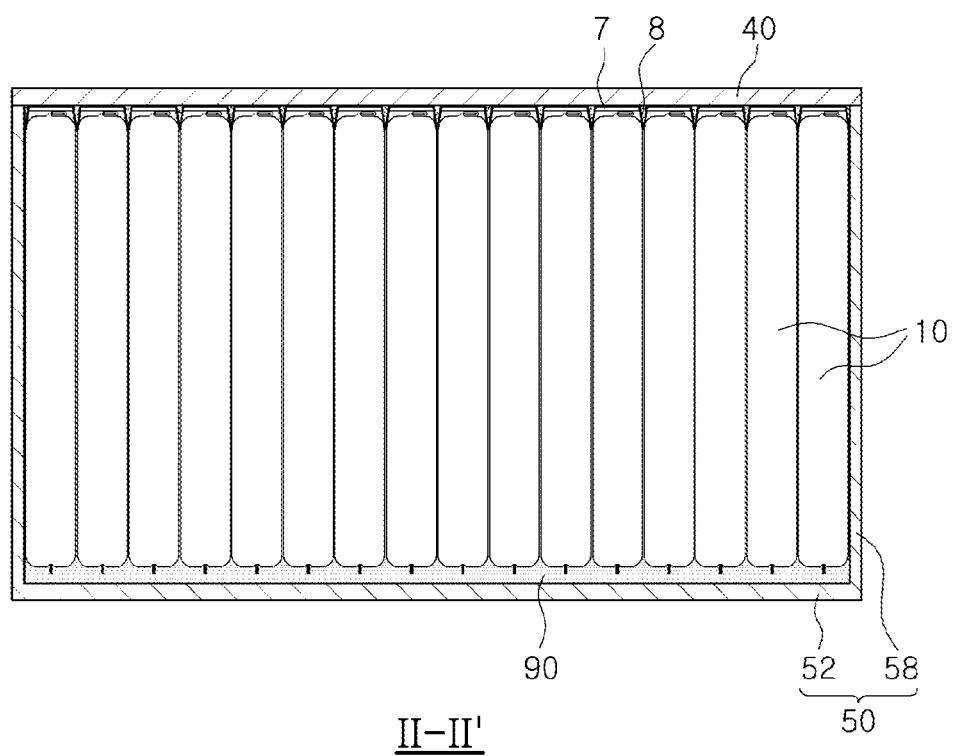
FIG. 7 is a partial cross-sectional view taken along II-II' of FIG. 5.

FIG. 5 is a perspective view schematically illustrating a battery module according to an exemplary embodiment in the present disclosure, FIG. 6 is an exploded perspective view of the battery module illustrated in FIG. 5, and FIG. 7 is a cross-sectional view taken along II-II' of FIG. 5.

Referring to FIGS. 5 through 7 together, the battery module 100 of the present exemplary embodiment may include a battery cell stack 1 in which a plurality of the battery cells 10 described above are stacked and a module case 30.

The battery cell stack 1 may be formed by stacking the battery cells 10 in a left-right direction (or a horizontal direction). However, the battery cell stack 1 may also be configured by stacking the battery cells 10 in an up-down direction (or a vertical direction), if necessary.

The module case 30 defines an exterior of the battery module 100, and may be disposed outside the plurality of battery cells 10 to protect the battery cells 10 from the external environment. At the same time, the module case 30 of the present exemplary embodiment may also function as a cooling member of the battery module.

The module case 30 of the present exemplary embodiment may include a first plate 50 disposed on one side of the battery cells 10, a second plate 40 disposed on the other side of the battery cells 10, and a cover 60 disposed on a side in which the electrode leads 15 of the battery cells 10 are disposed. Thereamong, the first plate 50 and the second plate 40 may function as cooling members of the battery module 100.

The first plate 50 may include a lower plate 52 disposed under the battery cells 10 and supporting a lower surface of the battery cells 10 and a side plate 58 supporting a side surface in which the accommodation portion 204 of the battery cells 10 is disposed. However, if necessary, it is also possible to configure the side plate 58 and the lower plate 52 as independent components.

The side plate 58 may be formed to extend from both sides of the lower plate 52 and is disposed on the sides of the battery cells 10 stacked in a left-right direction to support the accommodation portion 204 of the battery cells 10.

To firmly support the battery cell 10, the side plate 58 may be configured to contact the accommodation portion 204 of the battery cell 10. However, the present disclosure is not limited thereto, and various modifications may be made as needed, such as interposing a heat dissipation member or a buffer member between the side plate 58 and the accommodation portion 204.

The first plate 50 may be formed of a material having high thermal conductivity, such as metal. For example, the first plate 50 may be formed of an aluminum material. However, the present disclosure is not limited thereto, and various materials may be used as long as the material similar strength and thermal conductivity, even if it is not a metal.

The second plate 40 may be disposed on the top of the battery cell 10 and coupled to an upper surface of the battery cells 10. In addition, the second plate 40 may be fastened to an upper end of the side plate 58 of the first plate 50. Thus, when the second plate 40 is fastened to the first plate 50, the second plate 40 and the first plate 50 may have a shape of a hollow tubular member.

Like the first plate 50, the second plate 40 may be formed of a material having high thermal conductivity, such as metal. For example, the second plate 40 may be formed of an aluminum material. However, the present disclosure is not limited thereto, and various materials may be used as long as the material has similar strength and thermal conductivity, even if it is not a metal.

The first plate 50 and the second plate 40 may be coupled by a method such as welding or the like. However, the present disclosure is not limited thereto, and various modifications may be made such as coupling in a sliding manner or coupling using fixing members such as bolts or screws.

A heat transfer member 90 may be provided in at least one of portions between the battery cells 10 and the first plate 50 and between the battery cells 10 and the second plate 40. In FIG. 7, a case in which the heat transfer member 90 is disposed only in the lower portion of the battery cell 10 is illustrated as an example, but the present disclosure is not limited thereto and the heat transfer member 90 may also be disposed in both upper and lower portions of the battery cell 10.

The heat transfer member 90 transfers heat generated in the battery cell 10 to the module case 30. To this end, the heat transfer member 90 is formed of a material having high thermal conductivity. For example, the heat transfer member 90 may be formed of any one of thermal grease, a thermal adhesive, an epoxy resin, and a heat dissipation pad, but is not limited thereto.

The heat transfer member 90 may be disposed on the inner surface of the module case 30 as a pad or may be applied in a liquid or gel state to the inner surface of the module case 30. The heat transfer member 90 of the present exemplary embodiment has high insulation properties, and for example, a material having a dielectric strength in a range of 10 to 30 KV/mm may be used.

Accordingly, in the battery module 100 according to the present exemplary embodiment, even if insulation is partially broken in the battery cell 10, insulation between the battery cell 10 and the module case 30 may be maintained by the heat transfer member 90 disposed around the battery cell 10.

Meanwhile, as described above, the battery cell 10 of the present exemplary embodiment includes the reinforcing member 7 and the fixing member 8 for fixing the second sealing portion 2022. Since the reinforcing member 7 and the fixing member 8 are both formed of an electrically insulating material, the heat transfer member 90 may be omitted between the second sealing portion 2022 and the module case 30, or a material having a dielectric strength lower than the above range may also be used.

The side cover 60 is coupled to both sides on which the electrode leads 15 of the battery cells 10 are disposed, respectively.

The side cover 60 may be coupled to the first plate 50 and the second plate 40, thereby completing the exterior of the battery module 100 together with the first plate 50 and the second plate 40 together.

The side cover 60 may be formed of an insulating material such as resin and may include a through-hole 62 exposing externally a connection terminal 72 of an insulating cover 70, which will be described later.

The side cover 60 may be coupled to the first plate 50 and the second plate 40 through a fixing member such as a screw or a bolt. However, the present disclosure is not limited thereto.

The insulating cover 70 may be interposed between the side cover 60 and the battery cells 10.

The insulating cover 70 may be coupled to one surface on which the electrode leads 15 of the battery cells 10 are disposed.

The electrode leads 15 may pass through the insulating cover 70 and may be interconnected outside the insulating cover 70. To this end, as illustrated in FIG. 6, a plurality of through-holes 73 into which the electrode leads 15 are inserted may be provided in the insulating cover 70.

The insulating cover 70 may include a connection terminal for connection with the outside. Accordingly, the battery cells 10 may be electrically connected to the outside through the connection terminal 72, and to this end, the electrode lead 15 may be inserted into a slit 87 of a bus bar 86 provided in the insulating cover 70 and may be electrically connected to the connection terminal 72.

The connection terminal 72 may be exposed externally through the through-hole 62 formed in the side cover 60. Accordingly, the through-hole 62 of the cover 60 is formed to have a size corresponding to a size and shape of the connection terminal 72.

In addition, the insulating cover 70 may include a circuit board (e.g., a PCB) and a plurality of electronic devices mounted on the circuit board, and may perform a function of sensing a voltage of the battery cell 10 through the circuit board.

In the battery module 100 according to the present exemplary embodiment configured as described above, since the battery cell includes the reinforcing member 7 and the fixing member 8, the module case 30 may be configured to be in direct contact with the fixing member 8. Accordingly, a path for dissipating heat generated by the battery cell 10 may be shortened and a contact area between the upper surface of the battery cell 10 and the module case 30 may be maximized.

Therefore, heat generated by the battery cell 10 may be easily discharged to the second sealing portion 2022, thereby providing a high heat dissipation effect.

Meanwhile, the battery cell of the present disclosure is not limited to the exemplary embodiment described above and various modifications may be made.

Figure 8:
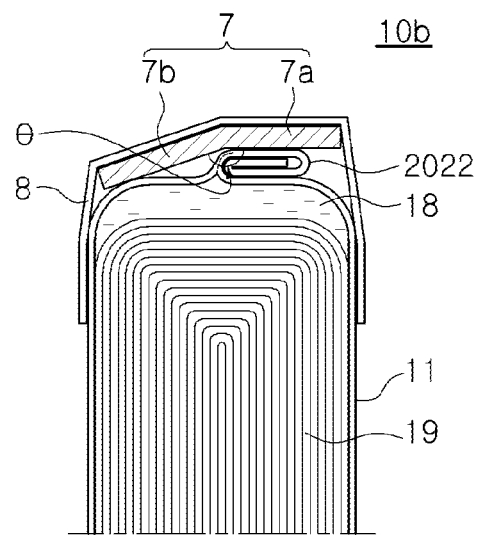
FIGS. 8 to 10 are cross-sectional views schematically illustrating a battery cell according to another exemplary embodiment in the present disclosure, respectively.
Figure 9:
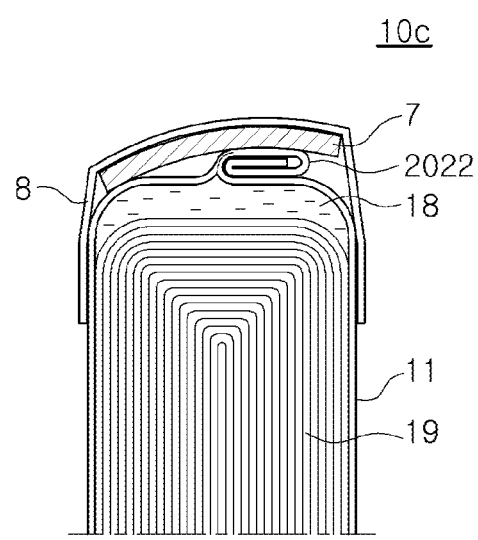
Figure 10:
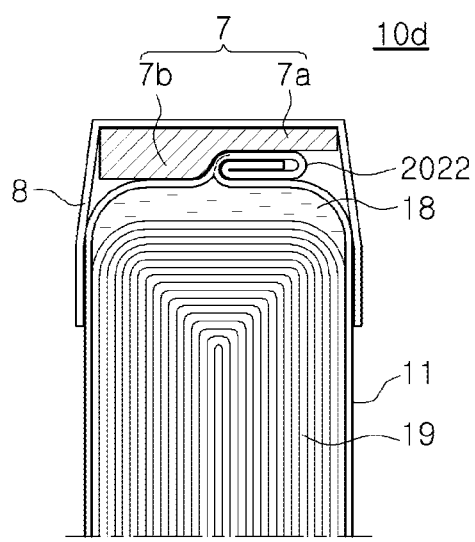

FIGS. 8 through 10 are cross-sectional views schematically illustrating a battery cell according to another exemplary embodiment in the present disclosure, respectively, which correspond to the cross-section of FIG. 3.

The battery cells illustrated in FIGS. 8 through 10 are configured to be similar to the exemplary embodiment described above, and differ only in the shape of the reinforcing member 7. Therefore, the configuration of the reinforcing member 7 with a difference will be mainly described.

Referring to FIG. 8, in a battery cell 10b of the present exemplary embodiment, the fixing member 8 may be partially bent.

With the bent portion as a boundary, the reinforcing member 7 may be divided into a pressing portion 7a in contact with the second sealing portion 2022 and pressing the second sealing portion 2022 and a support portion 7b in contact with the accommodation portion 204 side of the battery cell 10b.

The pressing portion 7a and the support portion 7b may be formed to be flat and may be distinguished from each other according to bending at a certain angle. Accordingly, the pressing portion 7a and the support portion 7b may be configured to be disposed on different planes. In this case, an internal angle θ between the pressing portion 7a and the support portion 7b may be formed to be 180° or less.

Since the pressing portion 7a presses the second sealing portion 2022, the pressing portion 7a may be disposed in parallel with the second sealing portion 2022.

The support portion 7b extends from the pressing portion 7a, and at least a portion thereof is arranged to contact the accommodation portion 204.

Therefore, when the reinforcing member 7 is coupled to the cell case 11, the pressing portion 7a may be in surface contact with the second sealing portion 2022 and the support portion 7b may be in contact with the accommodation portion 204 to support the pressing portion 7a, and thus, the shake or movement of reinforcing member 7 during a manufacturing process may be minimized.

The internal angle θ between the pressing portion 7a and the support portion 7b may be changed according to a thickness of the second sealing portion 2022 and a thickness of the accommodation portion 204. For example, the internal angle θ may be defined as an angle at which the pressing portion 7a is in surface contact with the second sealing portion 2022 and the support portion 7b is in contact with the accommodation portion 204.

Therefore, the internal angle θ may increase as the thickness of the accommodation portion 204 increases or the thickness of the second sealing portion 2022 decreases.

Meanwhile, in the present exemplary embodiment, a case in which a width of the pressing portion 7a and a width of the support portion 7b are approximately the same is taken an example. However, the present disclosure is not limited thereto, and the pressing portion 7a and the support part 7b may have different width, if necessary.

Referring to FIG. 9, in a battery cell 10c of the present exemplary embodiment, an inner surface and an outer surface of the reinforcing member 7 may be formed to be curved.

The reinforcing member 7 of the present exemplary embodiment may have an arc-shaped cross-section in a width direction. Accordingly, the inner surface and the outer surface of the reinforcing member 7 may have a curved surface with a certain curvature, rather than a flat surface.

In the present exemplary embodiment, although the case in which both the inner and outer surfaces of the reinforcing member 7 are formed as curved surfaces is taken as an example, only any one of the inner and outer surfaces may be formed as a curved surface, if necessary.

The curvature of the reinforcing member 7 may be changed according to a thickness of the second sealing portion 2022 and a thickness of the accommodation portion 204. For example, as illustrated in FIG. 9, the radius of curvature of the reinforcing member 7 may be defined as a range in which at least a portion of the reinforcing member 7 is in surface contact with the second sealing portion 2022 and at least a portion thereof is in contact with the accommodation portion 204.

Therefore, the radius of curvature may increase as the thickness of the accommodation portion 204 increases or the thickness of the second sealing portion 2022 decreases.

Referring to FIG. 10, similarly to the exemplary embodiment of FIG. 8 described above, the reinforcing member 7 of the present exemplary embodiment may include a pressing portion 7a in contact with the second sealing portion 2022 and pressing the second sealing portion 2022 and a support portion 7b in contact with the accommodation portion 204 side of the battery cell.

The pressing portion 7a and the support portion 7b may be formed to have different thicknesses. Specifically, the support portion 7b may be formed to be thicker than the pressing portion 7a, and a step may be formed at a boundary between the pressing portion 7a and the support portion 7b.

The support portion 7b may be formed to be thicker than the pressing portion 7a by an amount corresponding to the thickness of the second sealing portion 2022.

When the reinforcing member 7 is coupled to the battery cell, the pressing portion 7a of the reinforcing member 7 may be in surface contact with the second sealing portion 2022, and the support portion 7b may be in surface contact with the accommodation portion 204, thus being coupled to the battery cell. An outer surface of the reinforcing member 7 may be formed to be flat.

Through this configuration, the reinforcing member 7 is coupled to the battery cell with both the pressing portion 7a and the support portion 7b in surface contact with the battery cell, and thus, the reinforcing member 7 may be more stably coupled to the battery cell.

In addition, in the case of the present exemplary embodiment, since the outer surface of the reinforcing member 7 is formed to be flat, handling of the battery cell is facilitated.

Figure 11:
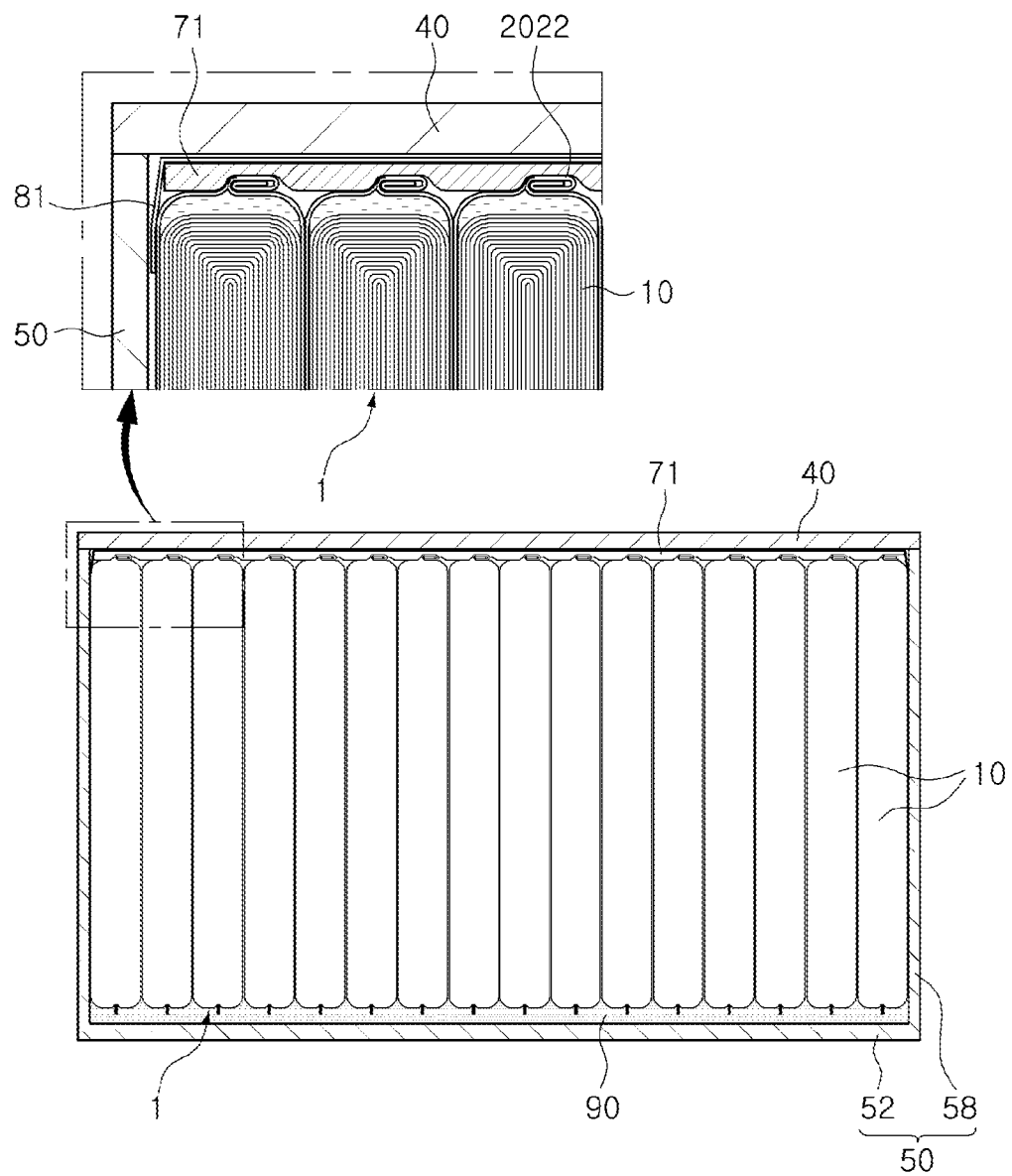
FIGS. 11 and 12 are cross-sectional views schematically illustrating a battery module according to another exemplary embodiment in the present disclosure, respectively.
Figure 12:
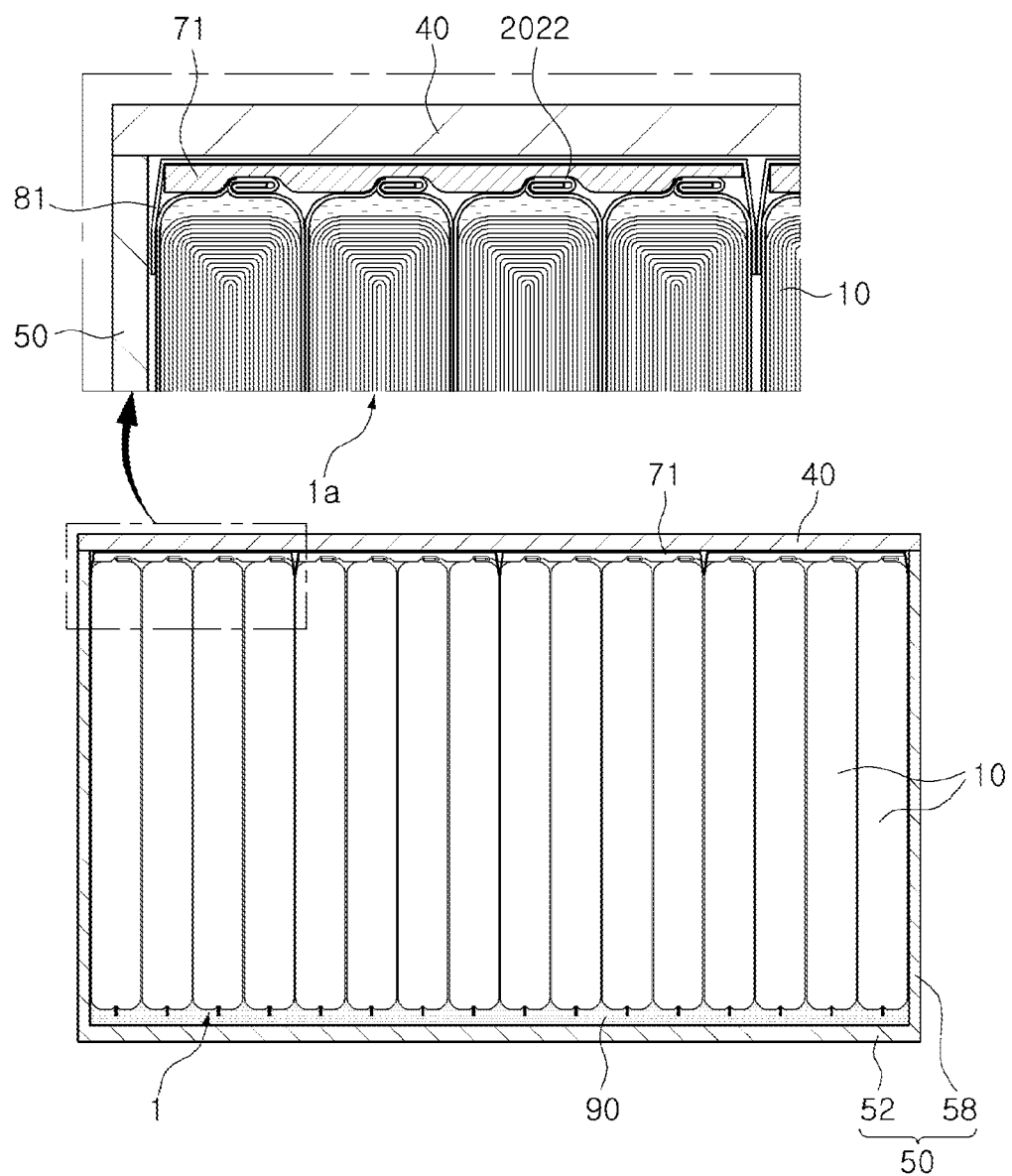

FIGS. 11 and 12 are cross-sectional views schematically illustrating a battery module according to another exemplary embodiment in the present disclosure, which correspond to the cross-section of FIG. FIG. 7.

The battery module illustrated in FIGS. 11 and 12 is configured to be similar to the exemplary embodiment described above and has a difference only in terms of a coupling structure of the reinforcing member and the battery cell.

Referring to FIG. 11, the battery module of the present exemplary embodiment is configured such that one reinforcing member 71 is coupled to a battery cell stack 1. A fixing member 81 is attached to the battery cell stack 1 and the reinforcing member 71 to closely fix the reinforcing member 71 to the battery cell stack 1.

Accordingly, the second sealing portion 2022 of all of the battery cells 10 may be pressed by the reinforcing member 71 so as to be in surface contact with the reinforcing member 71.

In the present exemplary embodiment, only one reinforcing member 71 is provided. Thus, the fixing member 81 bonded to the reinforcing member 71 may be bonded only to the battery cells 10 disposed on opposing sides of the battery cell stack 1, rather than being bonded to each battery cell 10.

Referring to FIG. 12, the battery cell stack 1 may be divided into a plurality of cell groups 1a. Each cell group 1a may include a plurality of battery cells 10, and the reinforcing member 72 may be coupled to each cell group 1a in a one by one manner.

Accordingly, the battery cells 10 included in each cell group 1a may be arranged such that the second sealing portion 2022 is pressed by one reinforcing member 71 so as to be in contact with the reinforcing member 71.

As such, in the battery cell module of the present exemplary embodiment, one reinforcing member may be coupled to at least two battery cells or the entire battery cell stack. Accordingly, a time required for coupling the battery cell to the reinforcing member may be reduced, thereby minimizing a manufacturing time.

Meanwhile, the reinforcing members illustrated in FIGS. 11 and 12 are extended based on the reinforcing member illustrated in FIG. 10 as an example. However, the configuration of the present disclosure is not limited thereto, and various modifications, such as extending and using the reinforcing members illustrated in FIGS. 3, 8 and 9, may be made. In addition, a reinforcing member may be configured to include different shapes without repeating the same shape. For example, various modifications may be made, configuring a reinforcing member by alternately arranging the reinforcing member having the shape of FIG. 3 and the reinforcing member having the shape of FIG. 10.

As set forth above, in the battery cell according to the exemplary embodiment in the present disclosure, since the sealing portion is stably fixed, deformation of the sealing portion may be suppressed. Accordingly, reliability of the battery cell may be improved and electrical insulation properties between the battery cell and the external structure may be strengthened.

While example exemplary embodiments have been illustrated and described above, it will be apparent to those skilled in the art that modifications and variations could be made without departing from the scope of the present disclosure as defined by the appended claims.

What is claimed is:

1. A battery cell comprising:
    an electrode assembly;
    a pouch-type cell case comprising an accommodation portion in which the electrode assembly is accommodated and a sealing portion formed in at least a portion of a circumference of the accommodation portion;
    a reinforcing member disposed on the sealing portion so that the sealing portion is in close contact with the accommodation portion; and
    a fixing member fixing the reinforcing member to the cell case,
    wherein the reinforcing member is disposed between the sealing portion and the fixing member,
    wherein the fixing member includes:
        a first portion and a second portion respectively in contact with a first surface and a second surface of the accommodation portion, which face each other; and
        a third portion disposed between the first portion and the second portion, and in contact with the reinforcing member, and
    wherein the electrode assembly is between the first surface and the second surface of the accommodation portion.

2. The battery cell of claim 1, wherein the sealing portion is folded at least once and subsequently in close contact with the accommodation portion, and
    wherein at least a portion of the sealing portion is disposed between the accommodation portion and the reinforcing member.

3. The battery cell of claim 1, wherein the reinforcing member may have a flat bar shape.

4. The battery cell of claim 1, wherein the reinforcing member comprises a pressing portion in surface contact with the sealing portion and a support portion extending from the pressing portion and having at least a portion in contact with the accommodation portion.

5. The battery cell of claim 4, wherein the support portion and the pressing portion are disposed on different planes.

6. The battery cell of claim 5, wherein an internal angle between the support portion and the pressing portion is 180° or less.

7. The battery cell of claim 4, wherein a thickness of the support portion is greater than a thickness of the pressing portion.

8. The battery cell of claim 1, wherein a cross-section of the reinforcing member in a width direction has an arc shape.

9. The battery cell of claim 1, wherein the reinforcing member has resistivity of 500 Ω·m or greater.

10. The battery cell of claim 1, wherein a width of the reinforcing member is smaller than a thickness of the accommodation portion.

11. The battery cell of claim 1, wherein the fixing member may include adhesive tape.

12. The battery cell of claim 11, wherein the fixing member is attached to cover the entirety of the reinforcing member.

13. The battery cell of claim 11, wherein the fixing member is provided in plural and the plurality of fixing members may be spaced apart from each other.

14. A battery module comprising:
a battery cell comprising an electrode assembly, a pouch-type cell case comprising an accommodation portion in which the electrode assembly is accommodated and a sealing portion formed in at least a portion of a circumference of the accommodation portion, a reinforcing member disposed on the sealing portion so that the sealing portion is in close contact with the accommodation portion, and a fixing member fixing the reinforcing member to the cell case; and
a module case accommodating the at least one battery cell therein,
wherein the reinforcing member is disposed between the sealing portion and the fixing member,
wherein the fixing member includes:
  a first portion and a second portion respectively in contact with a first surface and a second surface of the accommodation portion, which face each other; and
  a third portion disposed between the first portion and the second portion, and in contact with the reinforcing member, and
wherein the electrode assembly is between the first surface and the second surface of the accommodation portion.

15. A battery module comprising:
a battery cell stack in which a plurality of battery cells are stacked, each battery cell comprising a pouch-type cell case comprising an accommodation portion in which an electrode assembly is accommodated and a sealing portion formed in at least a portion of a circumference of the accommodation portion;
a reinforcing member coupled to one surface of the battery cell stack and disposed to be in surface contact with the sealing portion of at least two battery cells of the batter cell stack; and
a fixing member fixing and attaching the reinforcing member to the battery cell stack,
wherein the reinforcing member is disposed between the sealing portion and the fixing member,
wherein the fixing member includes:
a first portion and a second portion respectively in contact with a first surface and a second surface of the accommodation portion of end battery cells of the battery cell stack, which face each other; and
a third portion disposed between the first portion and the second portion, and in contact with the reinforcing member.

* * * * *